Figure 1:
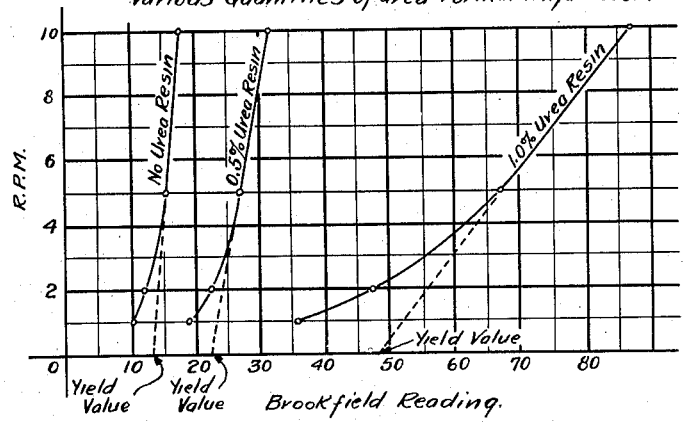

Feb. 3, 1959     F. J. SHELTON ET AL     2,872,421
PLYWOOD ADHESIVE COMPRISING UREA FORMALDEHYDE RESIN
PROTEIN AND DISPERSING AGENT AND PROCESS
FOR PREPARING SAME
Filed May 29, 1956

INVENTORS
Frederic J. Shelton and
Charles H. Chervenka.
BY Munson H. Lane.
ATTORNEY { United States Patent Office  2,872,421  Patented Feb. 3, 1959 }

2,872,421

PLYWOOD ADHESIVE COMPRISING UREA FORMALDEHYDE RESIN PROTEIN AND DISPERSING AGENT AND PROCESS FOR PREPARING SAME

Frederic James Shelton and Charles H. Chervenka, Seattle, Wash., assignors to Reichhold Chemicals, Inc., Detroit, Mich.

Application May 29, 1956, Serial No. 588,083

11 Claims. (Cl. 260—6)

This invention relates to an improved wet mixed plywood adhesive and method of making the same, and to a novel, fast cold pressing plywood gluing process. In particular, we have invented a new combination of an alkaline proteinaceous adhesive such as seed oil flours or blood adhesives, or mixtures thereof, and a urea-formaldehyde resin combination which possesses a greater tackiness than any straight proteinaceous adhesive heretofore known, and which property of increased tackiness enables the gluing of plywood at extremely short cold pressing times compared to known plywood gluing processes.

In accordance with our preferred process of forming the wet mixed plywood adhesive, the water and water soluble urea-formaldehyde resin are first added to the protein adhesive, after which alkaline dispersion is effected by the use of an alkali metal hydroxide as the main dispersing agent, and an alkaline earth hydroxide to aid in the dispersion and develop water resistance when the adhesive is dried. In addition an alkali metal silicate, such as sodium silicate, is employed and a waterproofing agent such as carbon disulfide, carbon tetrachloride, or ethylene trithiocarbonate is added.

In the prior art it is well known to glue plywood with alkaline protein adhesives and to retain clamping pressures of between 160 to 225 pounds per square inch to from five to an excess of twenty-five minutes. A good description of such a process may be found in U. S. Patent No. 2,402,492, Galber et al.

The preferred vegetable protein adhesive which we have found to have the desired increased tackiness for the desirable quick pressing is one made from soy bean flour, such as "Staley's I–200," available from A. E. Staley Company of Peoria, Illinois, Prosoy L and similar commercially available fine ground de-fatted, dehulled soy bean flour. These flours are typically ground to pass 95% through a 200 mesh screen and usually 90% will pass through a 325 mesh screen. A typical analysis is as follows:

| | Percent |
|---|---|
| Particle size | [1] 95 |
| Moisture content | 7.35 |
| Fat | 0.95 |
| Protein | 53.70 |
| Fiber | 2.46 |
| Ratio of water soluble nitrogen to total nitrogen | 59.1 |

[1] Through 200 mesh.

We have also found that mixtures of vegetable protein flour, particularly soy bean flour, and fine ground dried blood, such as Armour's type M soluble blood obtained from the Armour Packing Company, Chicago, Illinois, Ucopco brand soluble blood obtained from Wilson & Company, Chicago, Illinois, and Auburn Packing Company brand dry blood obtained from the Auburn Packing Company of Auburn, Washington, are satisfactory.

Where seed-oil flour-blood blends are used, the water solubility of the dried blood material is relatively unimportant since we have found that substantially any fine ground blood having a water solubility of from 5 to 100% will work satisfactorily. Where dried blood alone is used we prefer to use a blood having a water solubility of between 35 and 100%. Various salts and other modifying agents and defoamers may be incorporated along with the soy bean and/or dried blood in the dry mixed materials such as sodium fluoride, sodium carbonate, trisodium phosphate, calcium hydroxide, calcium carbonate, sodium acid fluoride, sodium bisulfate, sodium bisulfite, and the like, such as have been commonly used in adhesives compounded from soy bean and blood proteins as described in U. S. Patents Nos. 1,805,773, 1,854,701, 1,854,700 and 1,786,209.

We have found that a wide variety of urea-formaldehyde resinous condensation products are satisfactory. The molar ratio of formaldehyde to urea may vary within wide limits but is preferably maintained within the range of from 1.6 to 2.80 and the viscosity of a 65% solids water solution of the resin may vary between 10 C. P. and 500 C. P. at 70° F. so long as the resins are uniform and non-settling. Liquid urea-formaldehyde resins are particularly useful because they are readily handled and measured. The liquid urea-formaldehyde resins are superior to the solid crystalline methylol ureas in being free from dust. Water suspensions of crystalline methylol ureas are not satisfactory because they tend to settle and cause non-uniformity of the final glue mix. Liquid urea-formaldehyde resins are superior to a water suspension of crystalline methylol ureas because of their resinous nature. The liquid urea-formaldehyde resins do not settle and are therefore more accurately measured and safely used. The non-settling characteristics of the urea-formaldehyde polymer water suspensions are very important because of the small but critical quantity of the polymer necessary to achieve the desired viscosity effects in the protein adhesive containing the admixed urea resin. Useful urea-formaldehyde resins may be made according to U. S. Patents Nos. 2,428,752, 2,554,424, and others.

Typical 65% solids content urea-formaldehyde resins are Amres 250, obtainable from the American-Marietta Company of Seattle, Washington; Casco 5, obtainable from the Borden Company, Chemical Division, Seattle, Washington; and SW-1775 Plyamine, obtainable from Reichhold Chemicals, Inc., Seattle, Washington.

In combining a urea-formaldehyde resin into a protein adhesive we have found that a urea-formaldehyde resin should be added to the soy bean flour, blood or blood-soy bean flour mixture or the like prior to alkaline dispersion of the soy bean flour, blood or soy bean flour-blood mixture. We have found that the concentration of the urea-formaldehyde resin with respect to the protein material in the water solution at the time of contact with the protein material is important and may vary substantially between 0.5 and 2 parts of urea resin solids per 100 parts of protein material. Outside of this range, the resulting product is too thin or lumpy or too thick to be of substantial practical use. Not only is the concentration of the water solutions of urea-formaldehyde resin important, but we have also found that the pH of the water suspension mixture of the urea-formaldehyde resin and protein material is important and should not be more alkaline than the pH of 10. If more highly alkaline pH than 10 is present at the time of the combination of the urea-formaldehyde resin and the protein material, a very fast reaction of the resin and the protein material takes place and practically instantaneous localized gelation takes place with balling up and lumping, and it is difficult if not impossible to uniformly distribute the resin in the protein mix. It is important in our process that the resin be uniformly distributed in the protein mix.

The preferred procedure used to make a wet mixed protein adhesive is: (a) firstly to suspend the protein uniformly in the water, (b) secondly to add the requisite hydrated lime or other alkaline earth hydroxide suspended in water, (c) thirdly, to add the requisite sodium hydroxide or other alkali metal solution, (d) fourthly, to add the requisite amount of sodium or other alkali metal silicate solution, and (e) fifthly, to add the requisite amount of carbon disulfide solution or other waterproofing agent. We have found that the combination of urea-formaldehyde resin with the protein material takes place prior to step (b). The urea-formaldehyde resin may be dissolved in the first water of the adhesive mix prior to step (a) or the urea-formaldehyde resin may be added simultaneously with the protein material in step (a).

Figure 3:
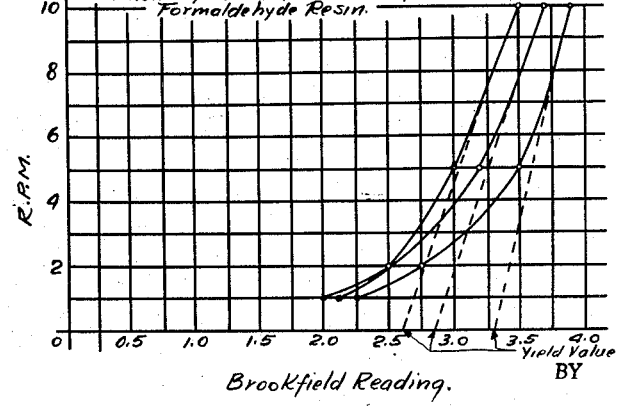

The adhesive of our invention is a colloidal dispersion having non-Newtonian flow characteristics. A description of plastic flow may be found on page 151, Figure 3, of Colloidal Dispersions by E. K. Fischer, published by John Wiley & Sons. Another reference is page 156 of Colloid Science by J. W. McBain, published by D. C. Heath & Company. The non-Newtonian flow characteristics of our improved glue is best described by referring to a flow-stress diagram or rheogram wherein the force or stress causing shearing flow is graphed versus the flow. Where measurements are made with a Brookfield, Model HAF Viscosimeter the shearing stress is measured by the Brookfield reading and the flow is measured by the revolutions per minute (R. P. M.). This leads to a description of the flow properties in empirical units. A stress-flow diagram shows that a straight soy bean adhesive mix made without any urea-formaldehyde resin exhibits plastic flow and has a yield value of about 12.7 and a slope of 2. The addition of 1% of 65% solids urea-formaldehyde resin solution to the same mix produced an adhesive having pronouncedly different plastic flow characteristics. The yield value became 47.5 and the slope became 2.6. The new adhesive has a higher yield value than the original and does not flow as much under pressure as does the original requiring virtually four times the pressure to start flow compared with the original. It is this combination of flow properties that makes our adhesive capable of bonding at shorter press times than any of the prior adhesives known to us and is a valuable contribution to the art of plywood manufacture.

The high yield value of our adhesive is of particular importance because the yield value is identifiable with the force required to separate two laminae having a wet glue film between them. As the water is abstracted from the wet glue film by the drier wood laminae the yield value of the glue increases and finally is identifiable with the dry bond strength of the glue. The yield value of our glue upon clamping for two minutes is comparable to the yield value obtained with prior art glue when clamped for ten minutes under similar conditions.

Satisfactory plywood may be made using our improved adhesive and a clamping time of one to four minutes as compared to prior art clamping times of six to twenty-five minutes. It is obvious that a tremendous increase in the production rate of plywood manufacture is possible using the same press equipment but using our improved adhesive and plywood process. This improvement is brought about by the proper combination of urea-formaldehyde resin in a small quantity to a protein, blood, or soy bean-blood adhesive mixture.

In our adhesive we preferably employ an alkaline earth hydroxide such as calcium hydroxide, barium hydroxide, strontium hydroxide, or magnesium hyroxide to aid in the dispersion of the protein materials and to develop water resistance when the adhesive is dried in the glue line. We prefer to use sodium hydroxide as the main dispersing agent because of its cheapness and ready availability, but other alkali metal hydroxides such as potassium hydroxide or lithium hydroxide are also satisfactory. We use "N" brand sodium silicate obtainable from the Philadelphia Quartz Company of Philadelphia, Pennsylvania, as preferred silicate material. Other alkali metal silicates such as potassium silicate are satisfactory. We preferably use carbon disulfide to improve the water resistance of the resulting plywood bond; however, under some circumstances where a high degree of water resistance is not necessary the carbon disulfide may be omitted without materially detracting from the satisfactory properties of our adhesive. While carbon disulfide is our preferred waterproofing agent, other materials such as carbon tetrachloride or ethylene trithiocarbonate may be used with satisfactory results. In all cases our adhesive is characterized by an increased yield value which is sometimes described as increased tackiness over a comparable adhesive made without the urea-formaldehyde resin. A particular feature of our adhesive is that because of the increased tackiness it is possible to bond veneers with only short pressing times of from one to four minutes at 70° F. Densification of the veneers is greatly lessened because of this shorter pressing time, thus providing a greater recovery from the log. Accordingly, it is possible to employ much higher pressures and achieve better contact to the surfaces to be bonded and still not result in over densification of the finished plywood panel. We prefer to use pressures between 175 to 250 lbs. per square inch; however, our process will produce satisfactory plywood over the pressure range of substantially 75 lbs. per square inch to 350 lbs. per square inch. In general, at the shorter pressing times we prefer to use higher pressures. In any case the upper limit for useable pressure is slightly above the crushing point of the particular wood species being bonded. The moisture content of the veneers to be bonded with our improved adhesive is critical and we prefer to use veneer having a moisture content between 3 and 7%. However, the normal variation of moisture content obtainable in a plywood mill is much greater than this and we are able to obtain satisfactory plywood bonds using our improved adhesive on veneers having moisture contents up to 12% (expressed on a bone dry basis).

The following examples illustrate our process.

EXAMPLE I

This example shows the improvement obtained by combining a water soluble urea resin with an alkaline soy bean adhesive.

A dry mix was made of 188 grams of Prosoy L, 6 grams of hydrated tri-sodium phosphate (ground to pass through a 60 mesh screen), and 6 grams of steam distilled pine oil. This dry mixture was mixed with 350 cc. of room temperature water for ten minutes until lump freed in a conventional glue mixer. An additional quantity, 260 cc. of water containing varying amounts of Plyamine SW-1775 as shown in the table below and mixed for six minutes. Then were added in succession followed by two and one-half minute mixing period, 24 grams of hydrated lime suspended in 48 grams of water, 32 grams of 50% sodium hydroxide, and 50 grams of sodium silicate (Philadelphia Quartz Co., "N" Brand). To this mixture were added 3 cc. of a mixture comprising 75% by weight of carbon bisulfide in carbon tetrachloride and the whole mixture stirred five minutes. The resulting glues were used in the manufacture of plywood.

Measurements were made immediately upon completing mixing of the flow characteristics of the adhesives containing the varying quantities of water soluble urea resin with the following results:

*Brookfield readings (#6 spindle)*

| Glue | Grams of SW-1775 Plyamine | At 1 R.P.M. | At 2 R.P.M. | At 5 R.P.M. | At 10 R.P.M. |
|---|---|---|---|---|---|
| A | 0.0 | 10.2 | 12.2 | 15.5 | 18.0 |
| B | 1.0 | 19.1 | 22.5 | 27.0 | 32.0 |
| C | 2.0 | 35.4 | 47.0 | 67.0 | 86.5 |
| D | 4.0 | Gel | | | |

These data are plotted in Figure 1 and the following yield values were obtained:

| Glue | Grams of SW-1775 Plyamine | Yield Value | Percent Improvement over A |
|---|---|---|---|
| A | 0.0 | 13.2 | |
| B | 1.0 | 22.5 | 70 |
| C | 2.0 | 48.0 | 264 |
| D | 4.0 | Gel | |

The tackiness of adhesives B, C and D was much greater than that of adhesive A. 13/16" plywood was made with glues A, B and C using a wet gluespread of 140 lbs. per 1000 square feet of double glue line total assembly time of fifteen minutes and at varying pressing times and tested according to C. S. 45–48, paragraph 14a with the following results: (Five days were allowed to elapse after removal from the press before testing).

| | 1' Pressing Time | 2' Pressing Time | 4' Pressing Time |
|---|---|---|---|
| A | Delaminated | Delaminated | Delaminated. |
| B | Adhesion OK | Adhesion OK | Adhesion OK. |
| C | do | do | Do. |

These results show that the adhesion of plywood when glued with alkaline soybean adhesive containing 0.5 and 1.0 parts of urea resin per 100 parts of soybean flour is markedly improved at the shorter pressing time.

EXAMPLE II

The following is a description of the use of a water soluble urea resin syrup in combination with a commercial protein adhesive, Plyacien SW-1810, a blend of soybean flour containing 27% by weight of soluble blood, a product of Reichhold Chemicals, Inc.

199 grams of Plyacien SW-1810 were mixed with 350 cc. of 70° F. water and 6 cc. of steam distilled pine oil for ten minutes at which time the mix was free from lumps. 540 cc. of additional water were then added together with varying amounts of Plyamine SW-1775 as shown in the table below and mixed for five minutes. The following materials were then added in succession followed by a two minute mixing period, hydrated lime 14 grams suspended in 28 cc. of water, 32 grams of 50% sodium hydroxide, 68 grams of sodium silicate (Philadelphia Quartz Co. "N" Brand). 4 cc. of carbon tetrachloride were then added and mixed for five minutes.

| Glue | Grams of Plyamine SW-1775 Added | Brookfield Reading | | | |
|---|---|---|---|---|---|
| | | At 1 R.P.M. | At 2 R.P.M. | At 4 R.P.M. | At 10 R.P.M. |
| E | 0.0 | 3.4 | 3.9 | 4.5 | 5.5 |
| F | 1.0 | 4.2 | 5.2 | 6.0 | 7.0 |
| G | 2.0 | 5.5 | 6.5 | 7.5 | 8.5 |
| H | 4.0 | 7.0 | 8.5 | 9.8 | 11.0 |

Figure 2:
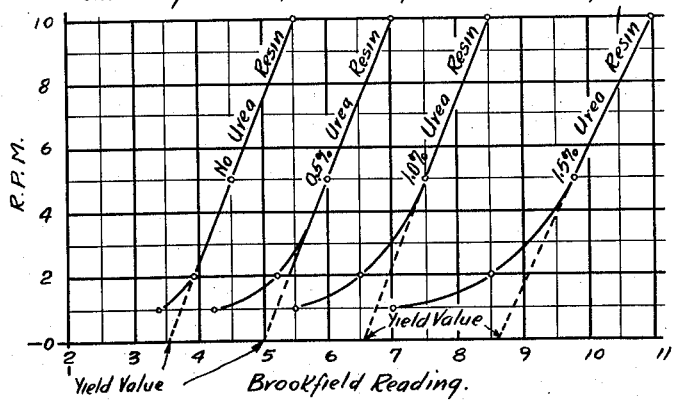

The yield values of the various glues were then determined from Figure 2.

| Glue | Yield value | Percent Improvement Over E |
|---|---|---|
| E | 3.5 | |
| F | 5.0 | 43 |
| G | 6.5 | 86 |
| H | 8.6 | 146 |

The tackiness of adhesives F, G and H was much greated than that of adhesive E. 13/16" plywood was then made using these various glues spread at the rate of 140 lbs. per 1000 square feet of double glue line total assembly time of fifteen minutes and pressed at various pressing times at 70° F. with the following results when tested as in Example I:

*Pressing time (minutes)*

| Glue | 1 | 2 | 3 |
|---|---|---|---|
| E | Delaminated | Delaminated | Delaminated. |
| F | do | Adhesion OK | Adhesion OK. |
| G | Adhesion OK | do | Do. |
| H | do | do | Do. |

These results show the difference in required pressing time for a soybean flour-soluble blood blend glue made with and without the addition of a soluble urea resin syrup.

The invention has been described in detail for the purpose of illustration but it will be apparent that numerous modifications and variations may be resorted to without departing from the spirit of the invention.

We claim:

1. A wet plywood adhesive comprising (1) a dispersion containing principally (a) a protein adhesive and (b) a relatively small quantity of a viscosity modifying reagent comprising a water soluble urea formaldehyde resin, and (c) water, dispersed with the aid of (2) an added strong alkaline dispersing agent comprising both alkaline earth and alkali metal hydroxides, the protein adhesive being selected from a group consisting of soy bean flour and blood adhesives and mixtures thereof, and the urea formaldehyde resin being used in the proportion of 0.5 to 2 parts urea resin solids per 100 parts protein adhesive.

2. A wet plywood adhesive as set forth in claim 1 suitable for cold pressing in one to four minutes, wherein the protein adhesive is principally soy bean.

3. A wet plywood adhesive as set forth in claim 1 including an alkali metal silicate.

4. A wet plywood adhesive as set forth in claim 1 including a waterproofing agent.

5. A wet plywood adhesive as set forth in claim 1, comprising a waterproofing agent selected from a group consisting of carbon disulfide, carbon tetrachloride, ethylene trithiocarbonate, and mixtures thereof.

6. A wet plywood adhesive as set forth in claim 1, wherein the alkaline earth hydroxide is calcium hydroxide.

7. A wet plywood adhesive as set forth in claim 1, wherein the alkaline metal hydroxide comprises sodium hydroxide.

8. A wet plywood adhesive as set forth in claim 3, wherein the alkali metal silicate comprises sodium silicate.

9. A wet plywood adhesive as set forth in claim 4, wherein the waterproofing agent comprises carbon disulfide.

10. A process of making a wet plywood adhesive, which comprises admixing a protein adhesive, a relatively small quantity of a water soluble urea-formaldehyde resin, and water, and then dispersing with the aid of an added strong inorganic alkaline dispersing agent comprising both alkaline earth and alkali metal hydroxides, the protein adhesive being selected from a group consisting of soy bean flour and blood adhesives and mixtures thereof, and the urea formaldehyde resin being used in the proportion of 0.5 to 2 parts urea resin solids per 100 parts protein adhesive.

11. A process of making a wet plywood adhesive which comprises initially forming a mixture having an alkalinity not exceeding a pH of 10 of (1) protein adhesive selected from a group consisting of soy bean flour and blood adhesive, and (2) a viscosity modifying reagent comprising a water soluble urea-formaldehyde resin in the proportion of 0.5 to 2 parts urea resin solids per 100 parts protein adhesive, and (3) water, and then dispersing the mixture with a strongly alkaline dispersing agent comprising both alkaline earth and alkali metal hydroxides.

References Cited in the file of this patent

UNITED STATES PATENTS

| | | |
|---|---|---|
| 2,133,335 | Wilson et al. | Oct. 18, 1938 |
| 2,150,697 | Nevin | Mar. 14, 1939 |
| 2,291,586 | Galber et al. | July 28, 1942 |
| 2,620,316 | Ritson | Dec. 2, 1952 |
| 2,675,338 | Phillips | Apr. 13, 1954 |